UNITED STATES PATENT OFFICE.

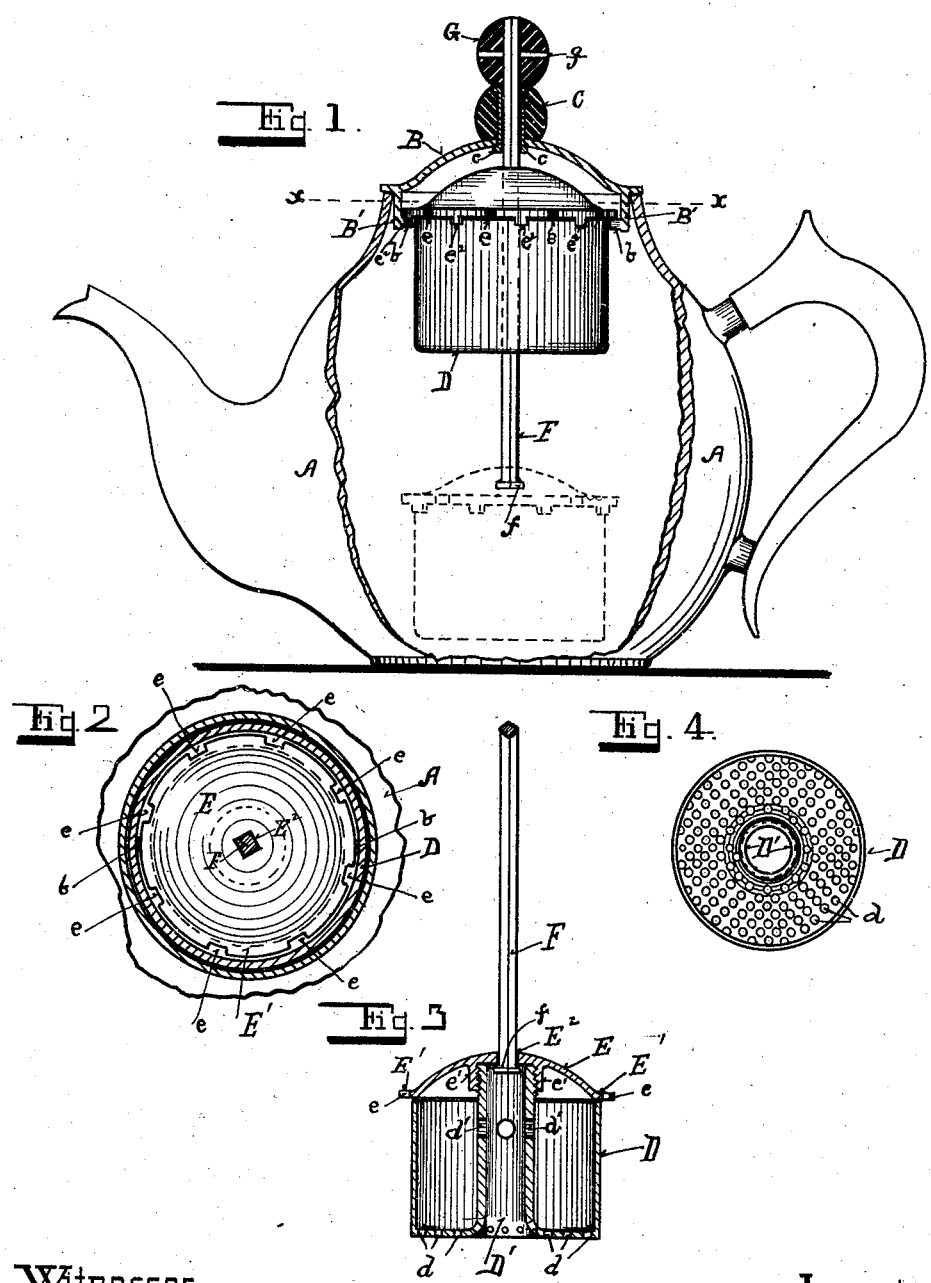

JOHN C. HOLLANDS, OF ERIE, PENNSYLVANIA.

TEA OR COFFEE POT.

985,176. Specification of Letters Patent. Patented Feb. 28, 1911.

Application filed May 19, 1910. Serial No. 562,268.

*To all whom it may concern:*

Be it known that I, JOHN C. HOLLANDS, a citizen of the United States, residing at Erie, in the county of Erie and State of Pennsylvania, have invented certain new and useful Improvements in Tea or Coffee Pots; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in tea and coffee pots, and has for its object the construction of a tea or coffee pot in which the container in which the tea leaves or ground coffee is placed may be raised or lowered out of or into the liquid in the pot as may be desired.

In carrying out the objects of my invention I provide a container for the tea leaves which is attached to a rod in such a manner that said rod can pass downward through the bottom thereof, while the lower end of said rod is provided with a head or other means to prevent it from being withdrawn out of the cover of said retainer. The upper end of said rod extends upward through the cover of the tea or coffee pot where it is provided with a knob to retain it from falling down into the tea pot, and the inner flange of the cover of the tea pot is provided with studs adapted to engage the retainer when it is lifted upward and retain the same in an elevated position while the rod is permitted to again slide downward therethrough to its normal position. These and other features will be more fully explained hereinafter in the specification and claims and illustrated in the accompanying drawings in which:

Figure 1 is a side view in elevation of my improved tea pot with portions thereof broken away showing the container in a raised position therein. Fig. 2 is a horizontal section on the line $x$—$x$ in Fig. 1, looking downward, portions thereof being broken away. Fig. 3 is a vertical central section through the container. Fig. 4 is a plan view of the container cup with the cover thereof removed.

In these drawings, A, indicates the body of a tea or coffee pot, and B, indicates the cover thereof. The cover, B, is provided with a downwardly extending cylindrical flange, B′, which is provided with horizontal or radial studs, $b$, $b$; the top web of the cover, B, is preferably dome-shaped, and at the apex of the dome I secure a knob C, by means of a sleeve, $c$. For receiving and retaining the tea leaves or ground coffee, I construct a cup in which a centrally positioned tube or sleeve, D′, springs upward from the bottom thereof, the upper end of said sleeve being provided with peripheral screw-threads for the purpose hereinafter set forth. The bottom of this container cup is provided with perforations $d$, as shown in Figs. 3 and 4, or it may, with equally good results, be made of wire fabric. While I have only shown perforations in the bottom of the container cup, D, it is apparent that said perforations may be extended up the sides of said cup, or that the entire cup portion could be constructed of wire fabric if desired without departing from the spirit of my invention.

I preferably provide perforations, $d'$, for the purpose of permitting a circulation of liquid upward in the sleeve, D′, and through said holes, $d'$, onto the upper surface of the tea leaves in the cup thus facilitating the steeping thereof.

The cover, E, of the container is preferably constructed dome-shaped to conform to the shape of the cover, B, of the tea pot, and is provided with a radial flange, E′, in which notches, $e$, are provided, which are adapted to receive the radial studs, $b$, $b$, and permit the same to pass therethrough, so that the radial flange, E′, may be brought into engagement with the upper sides of said studs, $b$, $b$, as shown in Figs. 1 and 2. The cover, E, of the cup, D, is also provided on its under surface with an internally screw-threaded thimble $e'$, adapted to engage the screw-threads on the upper end of the central tube, D′, for the purpose of securing the cover, E, upon the container cup, D, and centrally within this internally screw-threaded thimble, e', through the cover, E, I provide an opening, E², to receive a rod, F, the lower end of which rod, F, is provided with a head f, or other means adapted to prevent the same from passing upward out of the opening, E², in the container cover, E. The upper end of said rod, F, extends upward through the sleeve, c, in the knob, C, on the top of the cover, B, where it is provided with a knob, G, which is rigidly secured thereto by means of a pin, g, passing therethrough.

For the purpose of rotating the container I preferably make the rod, F, of squared material, or provide the same with other means adapted to prevent said rod, F, from rotating in the opening, E², in the cover, E, of the cup, D, any of which might readily occur to the mind of mechanics skilled in the arts. To limit the rotation of the container when the same is raised as shown by full lines in Fig. 1, I provide on the lower surface of the radial flange, E', on the cover, E, thereof, downwardly projecting studs, e², as shown in Fig. 1, each of which studs, e², is positioned intermediate between the notches, e, in said flange, so that when the container is raised upward by the rod, F, until the flange, E', has passed above the studs, b, b, said container can be rotated only until a pair of said downwardly projecting studs, e², engage said radial studs, b, b, by means of which, said studs, b, b, are prevented from entering and passing through other notches, e, e, and thereby permitting the container to drop back into the position shown by broken lines in Fig. 1.

It will be observed from the foregoing description and from the drawings that while by means of the rod, F, the container is raised from the position thereof shown by broken lines in Fig. 1 to the position thereof shown by full lines in said figure, when it is securely engaged by the studs, b, b, the rod, F, will slide back downward therethrough and remain in its normal position as shown in said figure, until it is again raised upward. It is further apparent that it is not necessary to raise the rod, F, upward when it is desired to lower the container, but that the same may be accomplished by turning the knob G, sufficiently to permit the studs, b, b, to enter notches, e, e, which will permit the container to fall by gravity to the position thereof shown by broken lines in Fig. 1.

Having thus fully shown and described the construction and operation of my invention what I desire to secure by Letters-Patent of the United States is:

1. The combination in a tea-pot, of a body, a cover having a central opening therein, inwardly projecting studs on said cover, a leaf container having a central opening therein, means on said leaf container for engaging said studs when raised, a rod extending downward through the central opening in the cover slidably secured in the central opening in the leaf container whereby when the leaf container is secured in a raised position the rod will slide down therethrough, and means on the upper end of the rod to prevent the upper end thereof from passing downward through the cover, substantially as set forth.

2. The combination in a tea-pot, of a body, a cover therefor, a central knob thereon having an opening therethrough, a tea-leaf container adapted to pass down through the cover opening and having a vertical central opening therein, a rod having a knob on the upper end thereof passing down through the opening in the cover knob and into the central opening in the tea leaf container, means for securing said rod therein so that it cannot be withdrawn upward but will move downward therethrough freely when the tea leaf container is secured in a raised position, and means for securing the tea-leaf container in such raised position, substantially as set forth.

3. The combination in a tea pot of a body, a cover therefor having an opening therethrough, a leaf container comprising a cup having perforations through the wall thereof, a centrally positioned tube having screw threads on the upper end thereof, secured in said cup, a cover for said cup having a central internally screw threaded opening therethrough engaging the screw threads on said tube and retained in position thereby and having a central opening therethrough, a notched radial flange on said container cover, a rod slidably secured in said central opening in the container cover so that it may move downward through said tube, said rod extending upward to and slidably secured in the opening in the tea pot cover, and means on said tea pot cover to engage the flange on said container cover when desired, substantially as set forth.

4. The combination of a tea pot cover having a central opening therethrough, a tea leaf container comprising a perforated cup having a centrally located tube springing upward from the bottom thereof and having screw threads on the upper end thereof, a container cover having a squared central opening therethrough, an internally screw threaded thimble on the under side of said container cover concentric with said squared opening engaging the threads on said tube, a notched radial flange on said container cover, a squared rod headed at its lower end passing upward through said squared opening and extending to and through the opening in the tea pot cover, a knob secured on the upper end of said rod, means on said tea pot cover adapted to engage the radial flange on said container cover and retain the same as desired, and means on said container cover to limit the rotation thereof when raised, substantially as described.

In testimony whereof I affix my signature, in presence of two witnesses.

JOHN C. HOLLANDS.

Witnesses:
H. M. STURGEON,
FLORENCE STOCKERT.

Copies of this patent may be obtained for five cents each, by addressing the "Commissioner of Patents, Washington, D. C."